United States Patent [19]
Morozov et al.

[11] Patent Number: 5,798,580
[45] Date of Patent: Aug. 25, 1998

[54] CONTENTION FREE GLOBAL INTERCONNECTION

[76] Inventors: Valentin Morozov, 3208 Noble Ct., Boulder, Colo. 80301; Robert L. Emerald, 25151 Iroquois Ct., Barrington, Ill. 60010

[21] Appl. No.: 728,542

[22] Filed: Oct. 9, 1996

[51] Int. Cl.$^6$ .................................................. H04J 14/00
[52] U.S. Cl. ................. 307/112; 307/117; 370/380; 370/386; 370/388; 379/258; 379/306; 379/335; 359/117
[58] Field of Search ....................... 307/112, 117; 370/388, 380, 386, 357; 359/139, 128, 117; 379/306, 258, 335; 250/551, 229, 227.11

[56] References Cited

U.S. PATENT DOCUMENTS

| | | | |
|---|---|---|---|
| 4,785,446 | 11/1988 | Dias et al. | 370/388 |
| 4,894,818 | 1/1990 | Fujioka et al. | 359/128 |
| 5,258,978 | 11/1993 | Cloonan et al. | 370/411 |
| 5,576,873 | 11/1996 | Crossland et al. | 359/117 |

*Primary Examiner*—William M. Shoop, Jr.
*Assistant Examiner*—Albert W. Paladini
*Attorney, Agent, or Firm*—John G. Costa

[57] ABSTRACT

Contention free switches, networks and global interconnection systems for routing messages from N input sources to M output destinations are disclosed.

26 Claims, 10 Drawing Sheets

Contention Free 2 x 2 Crossbar Switch

System of Directly Connected Nodes

Figure 1

N x N Crossbar Switch System Network

Figure 2

8 x 8 OMEGA Switching Network

Figure 3

Contention Free 2 x 2 Crossbar Switch

Figure 4

Contention Free 4 x 4 Crossbar Switch

Figure 5

Conflict in an 8 x 8 OMEGA Switching Network
(Illustrated in Bold Lines)

Figure 6

Switch with Parallel, Point to Point, Optical Interconnects

Figure 7

Ideal Alignment of Input Cells, with Output Cells

Figure 8

Globally Interconnected 4 x 4 Contention Free Switch

Figure 9

Global Interconnection of One Node in a 8 Node System

Figure 10

CONTENTION FREE GLOBAL INTERCONNECTION

INTRODUCTION

This invention relates generally to contention free global interconnection and more particularly to contention free global interconnection switches and networks.

BACKGROUND OF THE INVENTION

Optics have been used to provide interconnections in computing and other types of switching structures. Switches are utilized at various levels of computer architecture and of other systems, such as in telecommunications.

In particular, there are at least two applications responsible for the current interest in free-space optical interconnects, namely, telecommunication/data communication switching networks and fine-grained parallel computers.

With respect to telecommunication/data communication switching networks, it is estimated that customer access to multimedia will require the switching of hundreds of thousands of subscriber lines, with each line running at more than five hundred megabytes per second. In order to meet this projected demand, throughputs which are three to four orders of magnitude greater than the projected capabilities of current electrical interconnect technology will be needed.

In regard to parallel computers, the power of parallel computers is related directly to the degree of communication between each of the computer's processing elements. The IEEE scalable coherent interface (SCI) promises to simplify the integration of large numbers of processors. Most bus designs are capable of linking at most four processors and even the most robust bus designs cannot support more than thirty-two processors. Another problem with a bus approach is bus contention. With a shared bus, one processor must wait to access memory whenever another processor is reading or writing memory. Thus, the system of interconnections by which a computer shares and transmits information among the computer's various processing elements is one of the most important characteristics of a parallel computer's architecture.

Ideally, in a telecommunication or data communication system, each input node is connected directly to each output node. In analogous terms, in the ideal computer, each processor is linked directly to every other processor so that the system is completely or globally connected.

Figure 1:
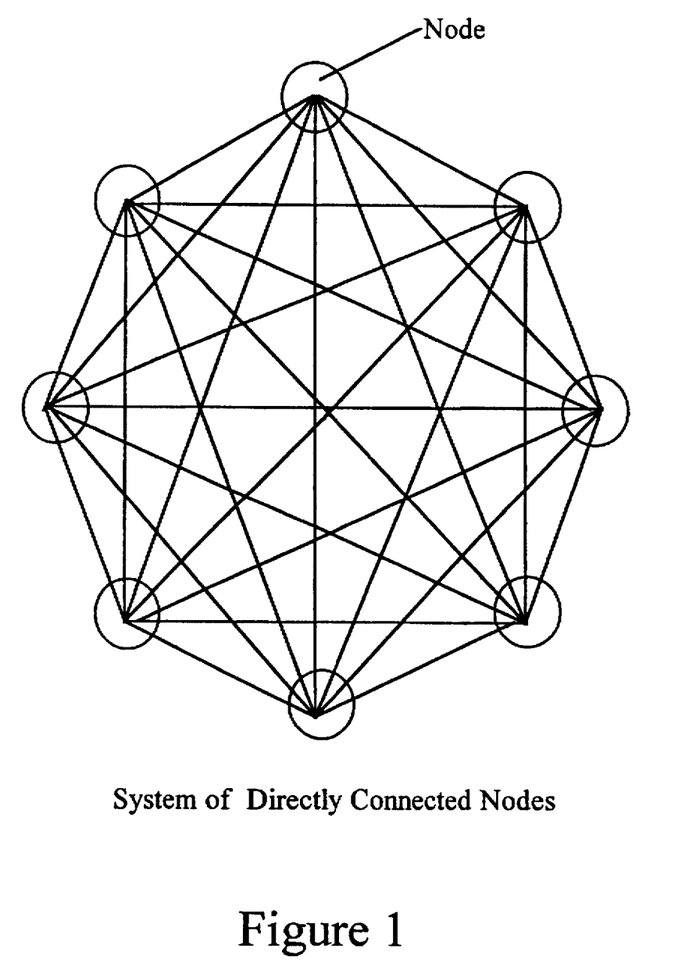
FIG. 1 is an illustration of an ideal system in which each node or processor of the system is directly connected or linked to every other node or processor of the system.

An illustration of an ideal system in which each node or processor is directly connected or linked to every other node or processor is shown in FIG. 1. In FIG. 1, each node is represented by a circle. However, as is discussed in detail by Pinkston in "The GLORY Strategy for Multiprocessors: Integrating Optics into the Interconnects Architecture" and Siegel in "Interconnection Networks for Large-Scale Parallel Processing", it is highly impractical to wire large systems in this manner.

Figure 2:
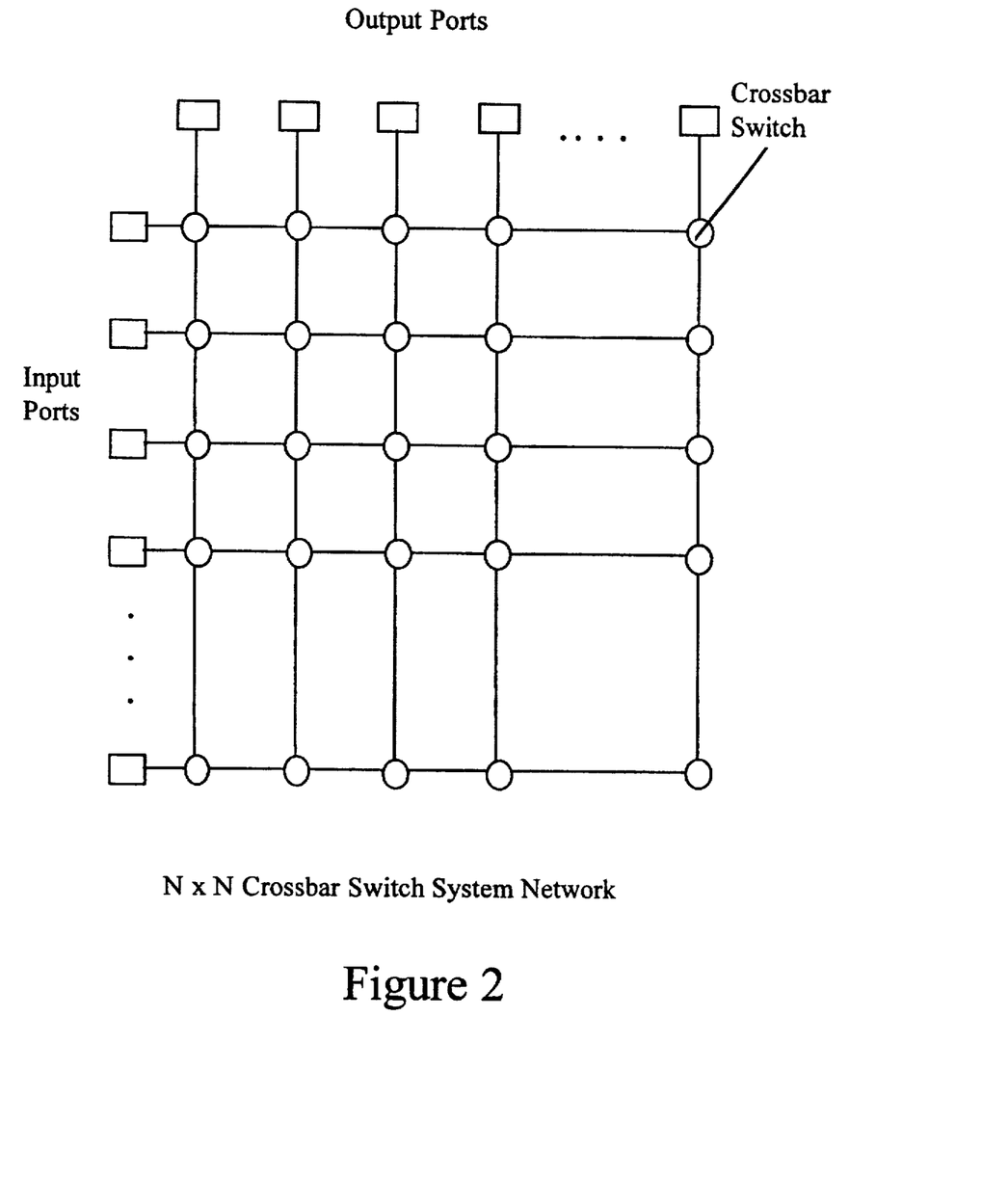
FIG. 2 is an illustration of a crossbar switch system network.

From a purely functional viewpoint, the crossbar switch system network, which is illustrated in FIG. 2, can facilitate the direct connection of any input channel to any output channel. In FIG. 2, the crossbar switches are represented by circles and the input and output ports are represented by rectangles. However, implementation of the crossbar system illustrated in FIG. 2 requires $n^2$ switches (where n is the number of both the input ports and the output ports of the system illustrated in FIG. 2).

The number of switches is significantly reduced by employing Multistage Interconnection Networks (MIN). A Multistage Interconnection Network is a practical compromise which allows the dynamically reconfigurable interconnection of each node or processor of a system to only one other node or processor of the system at a time. MINs are popular because, compared to a crossbar switch system network, the complexity of the hardware is reduced while the ability to establish a direct connection between any given input port to any given output port is maintained. A MIN employing 2×2 crossbar switches requires (n/2) $\log_2 n$ switches. This is less than the $n^2$ switches required for a full crossbar switch system. When n is large, the difference in the number of switches required by a crossbar switch system network and the number of switches required by a multistage interconnection network becomes significant.

Figure 3:
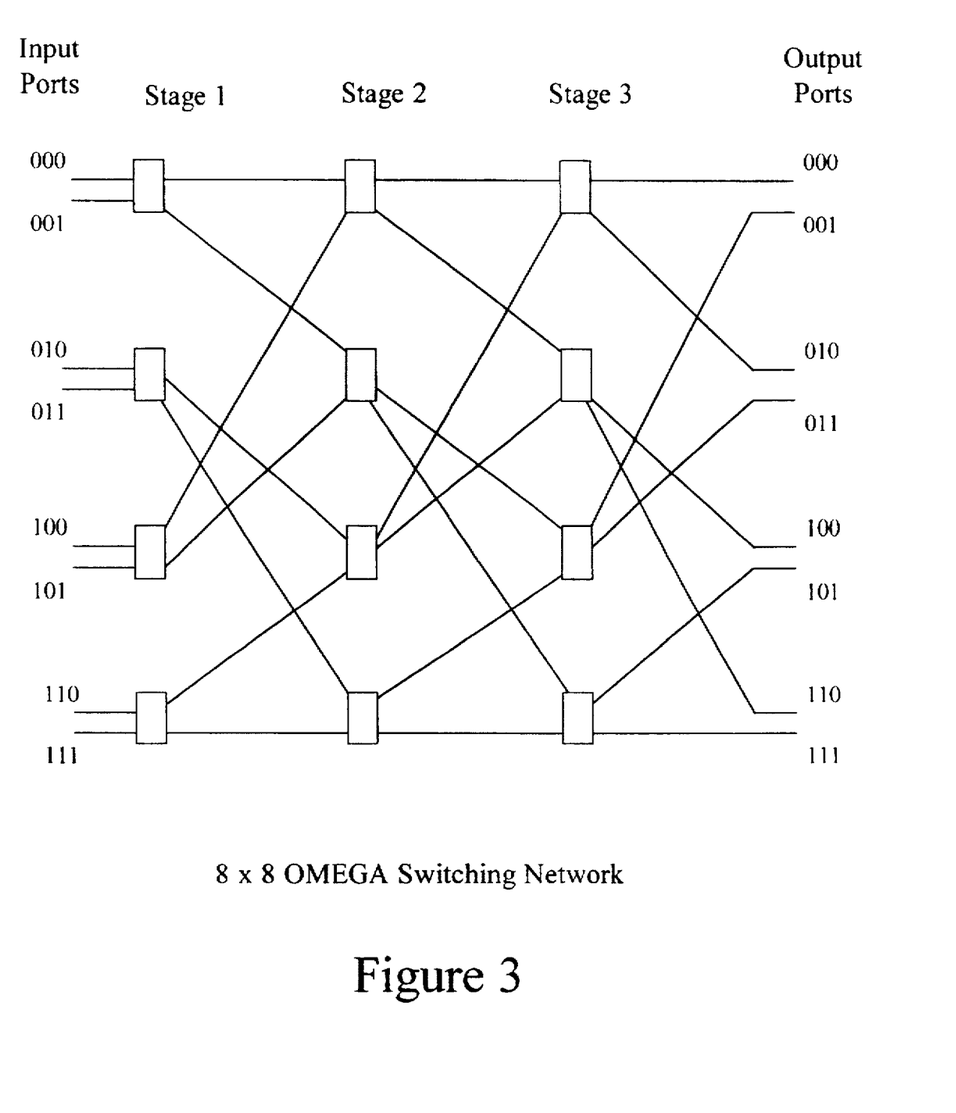
FIG. 3 is an illustration of a Multistage Interconnection Network (MIN) of the shuffle-exchange type.

A large class of MINs is topologically equivalent (isomorphic). That is, they have equivalent functional performance. Such isomorphic systems include: shuffle-exchange, banyan, omega, flip, baseline and delta networks. An 8×8 shuffle-exchange MIN, also known as an omega network, is depicted in FIG. 3. FIG. 3 demonstrates an interconnection pattern to transmit message data packages from eight input ports or sources to eight output ports or destinations. In FIG. 3, the switches are represented by rectangles. The network depicted in FIG. 3 has three shuffle switch stages and three exchange switch stages. Message data packages passing through the network carry routing information in their headers. The routing information is used to set the network switches for proper message routing. For example, in that portion of the binary message header representing the destination address, a "one" might represent the switch being set straight through (no exchange), and a "zero" would then represent the crossover setting (exchange). If a first stage switch of the MIN reads the most significant bit as a "one", it sets itself straight through while consuming this bit. A second stage switch sees the next most significant bit and sets itself to either the crossover or the straight through position depending on the value of this bit. A last stage switch sees the least significant bit and sets itself in accordance to the value of that bit, thus routing the message to the proper destination address.

Due to limitations of electrical interconnections, free-space optical interconnections will likely become more important as the trend towards the processing of larger data fields, such as those associated with documents, images, sound and video, continues.

All existing free-space, fiberoptic and waveguide interconnection networks are based on optoelectronic switches interconnected by modulating means such as holographic means or conventional optics means. Conventional imaging optics or conventional optics means include prisms, mirrors, lenses and other optical elements. The optical elements diffract, refract, reflect, fan out, collimate, focus, or otherwise modulate beams of light so that said beams are directed or redirected as desired by a given application. Notably, waveguides, and, in particular, waveguides with embedded holograms, so called waveguide holograms, are an interconnect system in themselves and may serve as a subsystem or as modulating means in an interconnect system. The basic building block for a free-space MIN is a 2×2 crossbar switch with two inputs and two outputs. Under the guidance of a control signal, any input can be transmitted to any output, but the commonly available optoelectronic crossbars do not permit the simultaneous sending of two inputs to one output. The implementation of large scale MIN is further complicated by the facts that the control signals become very complicated and that the message destination may be unknown. However, one of the most common problems in MIN design and implementation is the handling of message contention. Message contention arises when two or more inputs into the same switch request the same output.

SUMMARY OF THE INVENTION

It is an object of this invention to introduce means to overcome the problems of message routing and message contention in interconnection networks. In particular, it is an object of this invention to introduce means to overcome the problems of message routing and message contention in global interconnection networks.

Another object of this invention is to introduce the use of contention free switches in Multistage Interconnection Networks, crossbars, fully connected networks, and other switching systems.

It is another object of this invention to introduce a switch which is contention free.

It is another object of this invention to introduce a practical fully connected system.

It is another object to introduce the use of subcircuits, or cells, wherein each cell is specific for both an input and an output address and a specific input cell corresponds directly or indirectly with a specific output cell.

It is another object of the invention to introduce the use of a buffer in switches and in particular the use of a buffer in the cells of said switches, wherein said buffer stores a message data package for subsequent transmission.

It is another object of this invention to introduce the use of a controller in switches, and in particular the use of a controller in the cells of said switches, wherein said controller provides a time delay for a message data package and adjusts the output light intensity of a message data package. It is a further object of this invention to introduce modulating means which will permit the complete interconnection of each node of a system regardless of the spatial relation of one node to another.

It is a further object of this invention to introduce ideal alignments of corresponding light sources and photodetectors to simplify circuitry and to permit the choice of using holographic or conventional imaging optics for point to point transmission.

A switch introduced in this invention comprises at least one source (input channel) which transmits message data packages to an input circuit specific for said input channel. Said message data package is tagged to indicate its final destination (output channel) or destinations. Each input circuit comprises input cells specific for each destination. The function of the input circuit is similar to the function of a time division demultiplexer or to the function of a parallel shift register set in serial in to parallel out mode in that the input circuit reads a destination tag and transforms data received in series to data transmitted in parallel. An input circuit reads the destination tag on each message data package received and directs each message data package to the appropriate input cell or cells. Preferably, the subcircuitry of each cell comprises a buffer to store the message data package received and a controller to provide any time delay needed for the message data package and to adjust output light intensity as desired for the message data package. Thus, message data packages received in series from the input channels are routed in parallel, simultaneously and with equal intensities to their final destinations. Each input cell transmits the message data package it receives to a specific light source or to a specific location on a light source array, such as a vertical-cavity surface-emitting laser (VCSEL) array or other light source array. Each location on said light source array is individually controlled and specific for a given input cell. The message data package is then transmitted from the light source array through modulating means to a specific photodetector or to a specific location on a photodetector array. In particular, the optical output of each location of a light source array illuminates a specific predetermined location on the modulating means. The modulating means directs each of the incoming beams to a specific predetermined location on the appropriate photodetector array. The message data package is then transmitted from its location on a photodetector array to the appropriate output circuit. Each output circuit comprises output cells specific for each input channel. Each output circuit receives output signals from at least one photodetector array location, said location being specific to both the source and destination of the message data package. The function of the output circuit is similar to the function of a time division demultiplexer or to the function of a parallel shift register set in to parallel in to serial out mode in that the output circuit reads a destination tag and transforms data received in parallel to data transmitted in series. Based on the source (input channel) of the message data package received, each output circuit directs each message data package to the appropriate output cell. Each output cell then transmits the message data package to the output channel connected to the output circuit.

An alternative switch, which is practical only when the permissible density of electrical interconnects, for example on a printed circuit board, is not exceeded, permits the use of conventional imaging optics. In this switch each message data package may be transmitted along electrical wired, fiberoptic or waveguide interconnects from its location on a photodetector array to the appropriate output cell in the appropriate output circuit.

In such an alternative switch each message data package is transmitted with parallel, point to point optical interconnects. The switch comprises at least one input channel which transmits message data packages to an input circuit specific for said input channel. Said message data package is tagged to indicate its final destination. Each input circuit comprises input cells specific for each destination. Each input circuit reads the destination tag on each message data package received and directs each message data package to the appropriate input cell. Each input cell transmits the message data package it receives to a specific location on a light source array. The message data package is then transmitted by imaging optics from a light source array to a specific location on a photodetector array. The message data package is then transmitted from its location on a photodetector array to the appropriate output circuit. Each output circuit comprises output cells specific for each input channel. Each output circuit receives signals from at least one photodetector array location, said location being specific to both the source and destination of the message data package. Based on the source of the message data package received, each output circuit directs each message data package to the appropriate output cell. Each output cell then transmits the message data package to the output channel connected to the output circuit.

Another alternative switch provides for the ideal alignment of corresponding light sources and photodetectors. In this arrangement, there is point to point transmission, without any crossing of the transmission paths. In particular, there is a layering of transmission surfaces. Each transmission surface comprises photodetectors associated with a specific output channel, light sources associated with said photodetectors, and transmission paths from said light sources to said photodetectors. Although these transmission surfaces are layered and thus do not intersect, the exact contour of any given layer may be complex. In a cross section perpendicular to a line drawn from a light source to its associated photodetector, the transmission surfaces may appear, for example as parallel straight lines, concentric circles or ellipses, or parallel sinusoidal curves. The layering of said transmission surfaces is similar to the isobars on a map.The layers may be very irregular and may interdigitate but will not intersect. The exact contour of a transmission surface is determined by the position of photodetectors associated with a specific output channel, the light sources associated with said photodectors and the transmission paths from each light souce to its associated photodetector. For example, in FIG. 8, the light beam path from a light source associated with an input cell to the corresponding photodetector associated with an output cell is parallel to the light beam path from any other light source to its corresponding photodetector. For the configuration depicted in FIG. 8, each transmission surface would be a rectangular plane, the transmission surfaces are layered, and a cross section of the transmission surfaces would appear as a series of parallel lines. Notably the transmission paths may comprises free space transmission paths and wave guide transmission paths.

It is readily apparent that in the switches described there can be no contention from the input channels to the output circuits. For the switch to be completely contention free, the transmission of the message data packages from the output circuits to the output channels must also be contention free. In order to accomplish this, this invention also introduces the use of buffers to be utilized at appropriate places in a given switch to control the flow of data. For example, each of the output cells may comprise a buffer which stores a message data package until the output channel is free to receive said package. To further illustrate the use of buffers, consider a 2×2 crossbar switch in which each of the two input channels transmits a message data package destined for the same output channel. In this case, each of the two message data packages is routed to two different output cells on the same output circuit. The message data package from one of the output cells is transmitted to the output channel while the transmission of the message data package in the other output cell is stored only to be transmitted after the completion of the transmission from the other output cell when the output channel is free to receive another message data package.

This invention further introduces a practical fully connected system wherein each node of the system can transmit a signal to each node of the system. An advantage of a fully connected system is that it is inherently contention free. In one fully connected system the inputs and outputs are coupled. The operational principles are the same as for the crossbar switches. To facilitate the operation of a fully connected system, this invention introduces the use of modulating means to overcome the spatial difficulties which arise in large systems. Modulating means are placed to permit directing the output beams from the individual light sources to any node in the system. It is preferred that said modulating means comprise a lens to focus and collimate an output beam received from the light source and an array of refractive optical elements such as a dispersing or reflecting micro-prism array or an array of segmented mirrors to redirect the optical beams. The invention further introduces an alternative practical fully connected system wherein an input array and an output array are spatially aligned to permit point to point coupling of the light source array to the photodetector array.

Preferrably, the intensity of each light source is individually controlled or time modulated. That is, a specific light source is time modulated independently of each other light source. Binary ("0" or "1") or analog or continuous time modulation can be used to transmit the data. Each individual light source or location may comprise a vertical cavity surface emiting laser. Alternatively, an external light source may illuminate a cell or array of cells in a spatial light modulator array (SLM), and the output, that is, the transmittence or reflectance, of each cell is individually time modulated thus realizing individual control of the intensity of the light transmitted from the light source. In either case the light intensity is time modulated and then transmited through modulating means to a photodector.

For purposes of this invention, a light source array comprises a group, number or array of individual light sources. For purposes of this invention, a photodetector array comprises a group, number or array of individual photodetectors. For purposes of this invention, an input array comprises a group, number or array of individual input cells. For purposes of this invention, an output array comprises a group, number or array of individual output cells. For purposes of this invention, a modulating means array comprises a group, number or array of individual modulating means. Furthermore, each individual modulating means comprises holographic means and conventional optics means.

For purposes of this invention, a port comprises input channel and output channel. For purposes of this invention, a node comprises input channel, output channel, port, and coupled input/output cahnnels.

For purposes of this invention, point to point refers to the mapping of a particular point on a source image to the same point on a destination image.

For purposes of this invention the word "globally" comprises "fully" and "completely".

DESCRIPTION OF THE PREFERRED EMBODIMENTS

Figure 4:
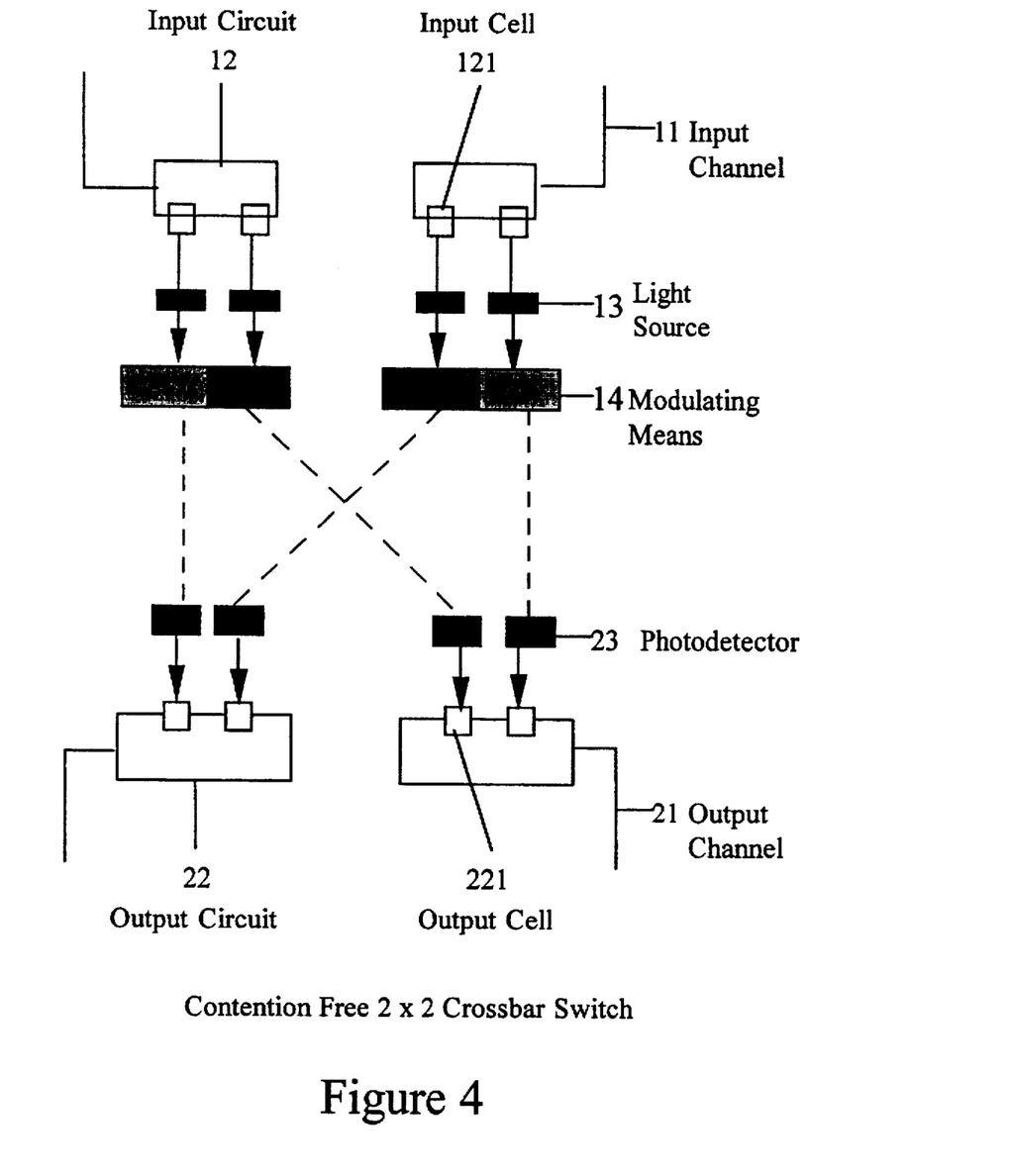
FIG. 4 is a schematic illustration of a contention free 2×2 crossbar switch.

This invention proposes a new N×M crossbar switch. For simplicity of illustration, the figures illustrate examples where M=N. Referring to the figures, a contention free 2×2 crossbar switch is depicted in FIG. 4 and a contention free 4×4 crossbar switch is detected in FIG. 5. This newly proposed N×M crossbar switch comprises N input channels (11), N input circuits (12), N×M light sources (13), N×M modulating means (14), M×N photodetectors (23), M output circuits (22), and M output channels(21). Each input circuit receives a signal from an input channel. Each input circuit comprises M cells (121). The input circuits direct the signals to the appropriate input cells dependent upon the destination of the signal. Each input cell is connected to a light source. The optical output of each light source illuminates a modulating means. The modulating means (14) is preferably a holographic array. The modulating means direct each of the incoming beams from each light source to the appropriate photodetector. The photodetectors are connected to output circuits. Each output circuit receives a signal from a photodetector. Each output circuit comprises N cells (221). The photodetectors direct the signals to the appropriate output cells. Each output circuit transmits a signal, if any, from each of its cells to an output channel. Preferably, the subcircuitry of each input and output cell comprises a buffer to store the message data package received and a controller to provide any time delay needed for the message data package and to adjust output light intensity as desired for the message data package. It should be noted that each of the N×M light sources, N×M modulating means, and M×N photodetectors may be independently situated or may be incorporated in an array comprising, respectively, other light sources, modulating means and photodetectors.

Figure 5:
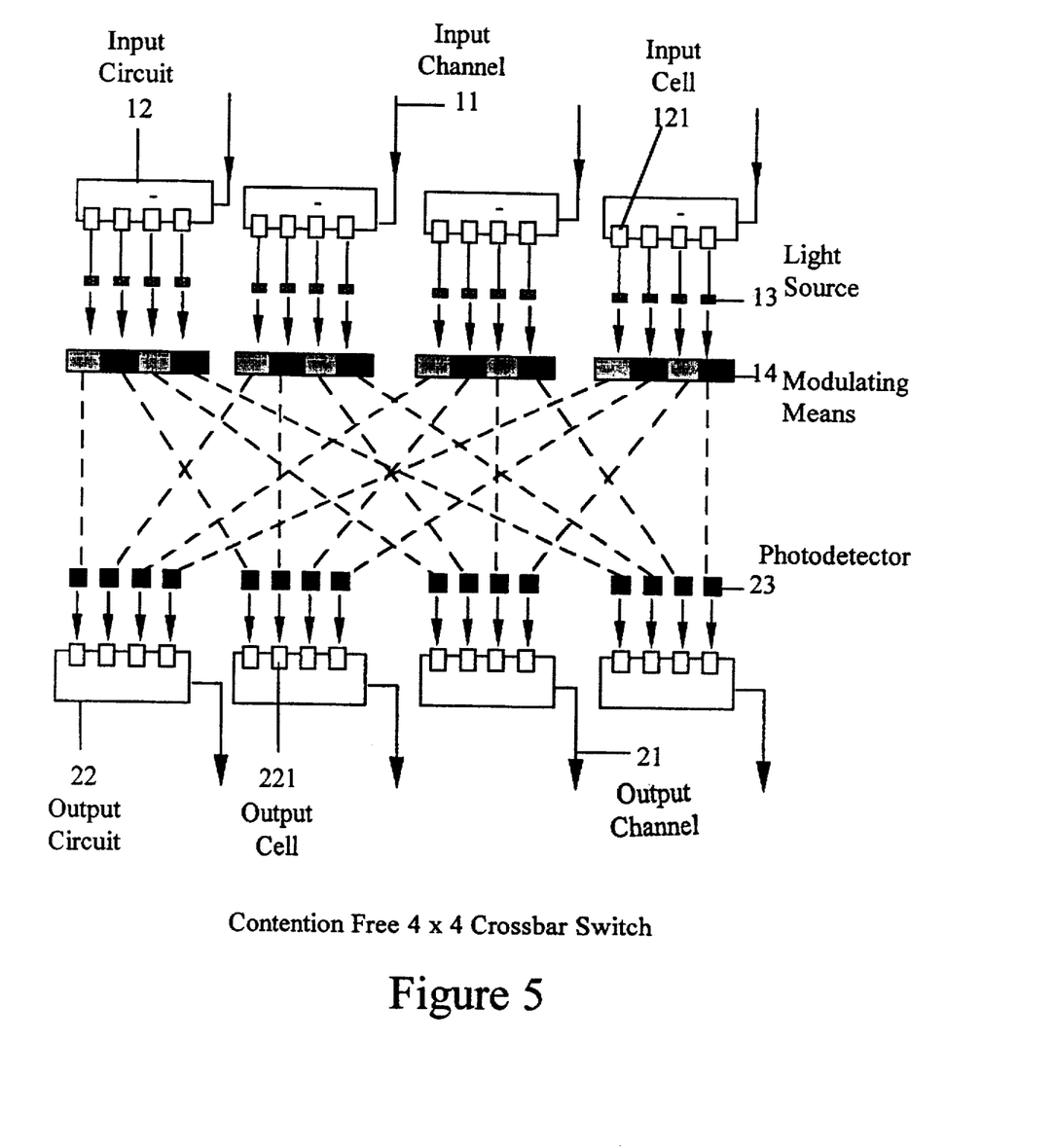
FIG. 5 is a schematic illustration of a contention free 4×4 crossbar switch.

For example, let i be an input signal from input channel i where i=1,2, ... N, and let j be a destination to an output channel j where j=1,2, ... M. Then, a signal from channel i to destination j is directed to cell i,j of input circuit i, then to location i,j on light source array i and then from light source array i to location i,j on modulating means array i. The modulating means array i directs the signal to location j,i on photodetector array j which in turn directs the signal to cell j,i of output circuit j.

Notably a message data package may comprise any number of bits from a single bit of information, such as a "0" or a "1", to an entire package of information, such as one or more computer words. Furthermore, all or any part of a signal may be packaged in one or more message data packages. Message data packages are appropriately tagged so that information is received at the output channel in the correct or desired sequence.

Figure 6:
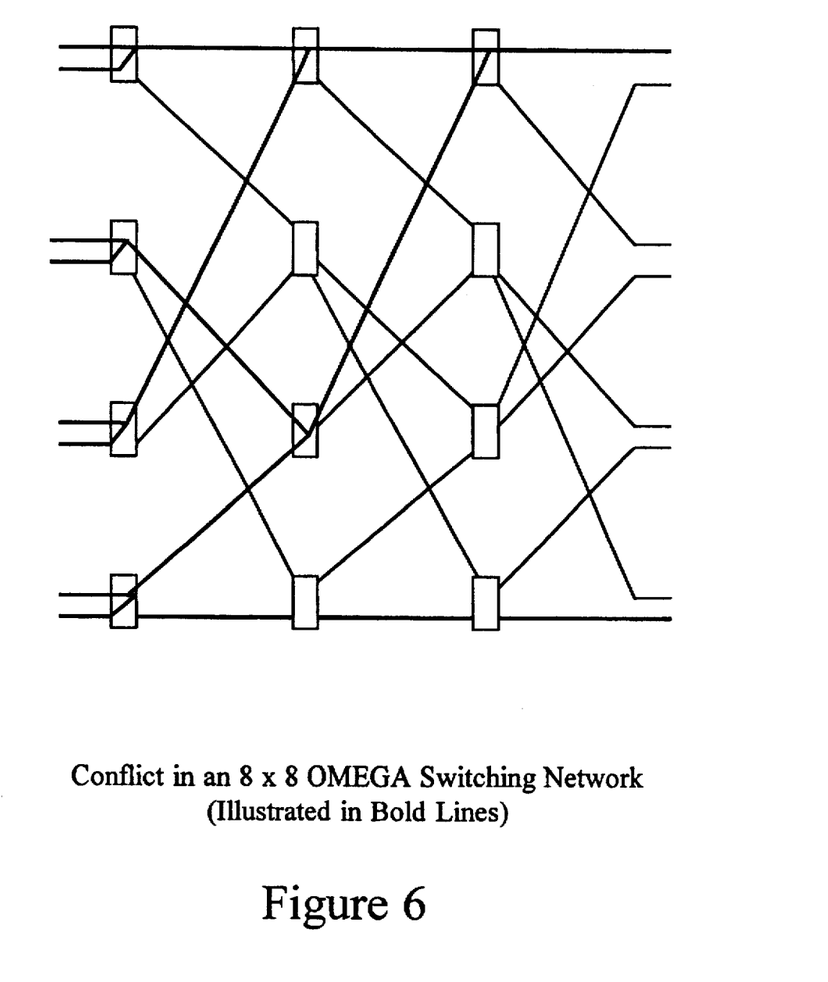
FIG. 6 illustrates an example of a contention problem.

FIG. 6 illustrates, in bold lines, an example of a contention problem arising in an 8×8 shuffle exchange interconnection network. When more than one input signal request the same destination, a contention occurs. To resolve this contention problem, the messages must be stored somewhere along the routing of the message. By modifying the output cells to comprise a buffer this storage is achieved and the problem of contention is resolved. Messages are stored in a buffer until the transmission of a previously received message requesting the same output channel is completed and the output channel is free to receive the next message.

Figure 7:
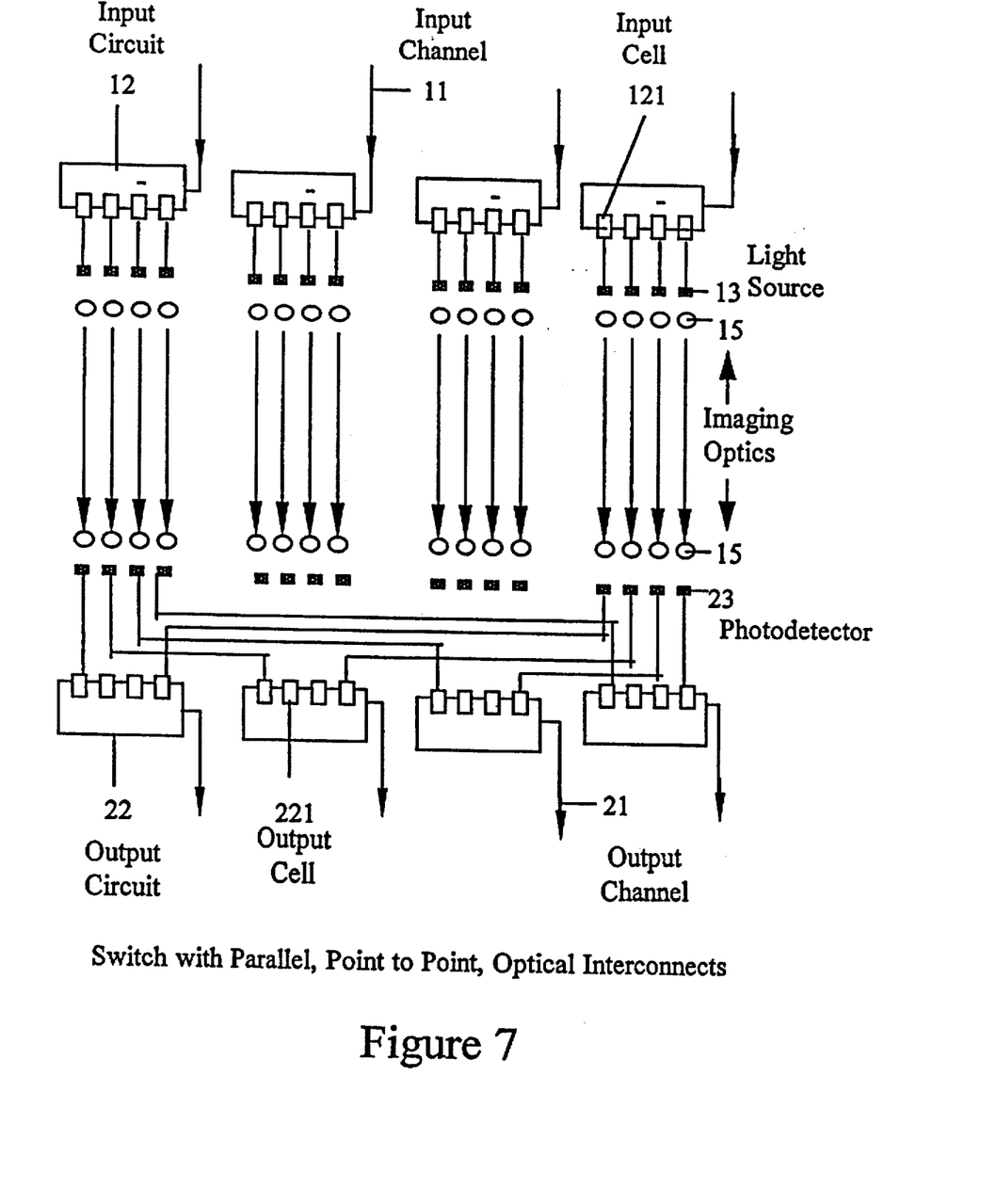
FIG. 7 is a diagram illustrating a contention free 4×4 switch based on point to point optical parallel interconnects.

FIG. 7 illustrates a switch in which each message data package is transmitted with parallel, point to point optical interconnects. The switch comprises at least one input channel which transmits message data packages to an input circuit specific for said input channel. Said message data package is tagged to indicate its final destination. The input circuit comprises input cells specific for each destination. The input circuit reads the destination tag on each message data package received and directs each message data package to the appropriate input cell. Each input cell transmits the message data package it receives to a light source array. The message data package is then transmitted by imaging optics (15) from the light source array to a photodetector array. The imaging optics (15) comprise conventional optics means, holographic means, or both conventional optic means and holographic means. The message data package is then transmitted from its location on a photodetector array to the appropriate output circuit. Each output circuit comprises output cells specific for each input channel. Each output circuit receives output signals from at least one photodetector array location, said location being specific to both the source and destination of the message data package. Based on the source of the message data package received, each output circuit directs each message data package to the appropriate output cell. Each output cell then transmits the message data package to the output channel connected to the output circuit.

Figure 8:
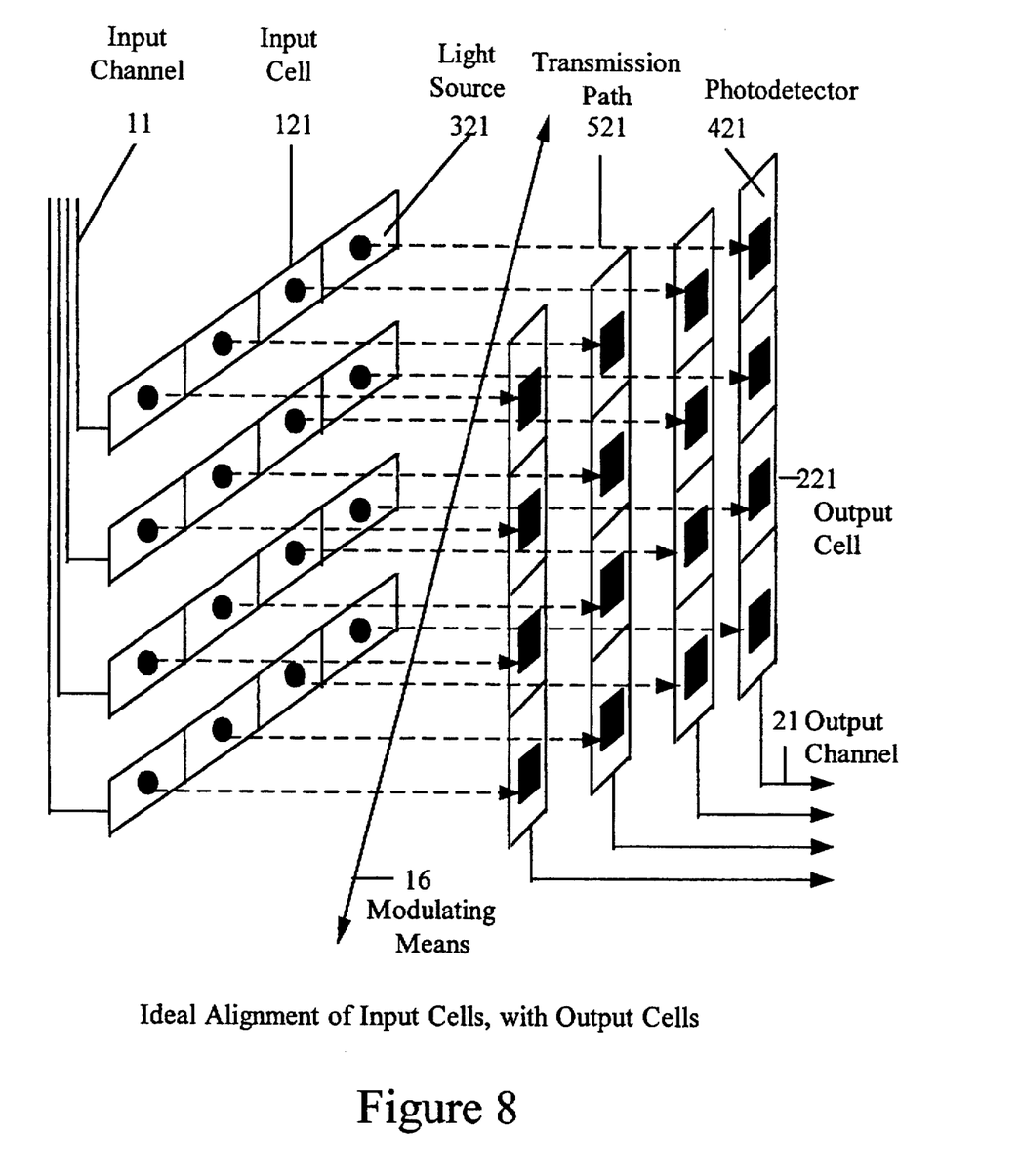
FIG. 8 illustrates ideal spatially aligned input and output arrays.

FIG. 8 illustrates an ideal alignment of the input cells of an input array or circuit with the output cells of an output array or circuit, wherein each input cell comprises a light source and each output cell comprises a photodetector. In particular, each pair of corresponding light sources (321) and photodetectors (421) is ideally spatially aligned to permit point to point transmission without any crossing of the transmission paths (521). For example, the light beam path from any light source to its corresponding photodetector is parallel to the light beam path from any other light source to its corresponding photodetector. Each transmission path may pass through modulating means (16). In FIG. 8, the light sources associated with the cells of an input circuit are arranged in parallel rows, wherein each column corresponds to a specific output channel. In like manner, the photodetectors associated with the cells of an output circuit are arranged in columns, wherein each row corresponds to a specific input channel. FIG. 8 illustrates the alignment of rectangular arrays. Other alignments permit point to point transmission without crossing of the transmission paths. For example, light sources associated with the cells of an input circuit can be arranged like the spokes of a wheel with the corresponding photodetectors associated with the cells of an output circuit arranged as concentric circles. Importantly, with the ideal alignment of corresponding light sources and photodetectors, the modulating means may comprise holographic means or conventional optics means or a combination of holographic means and conventional optics means. Ideal alignment for optical switching permits the use of conventional lens and lenslet arrays as modulating means.

In the ideal alignment of FIG. 8, a 4×4 contention free crossbar switch comprises a two dimensional matrix of light sources arranged in rows and a two dimensional matrix of photodetectors arranged in columns. Each row of the light source matrix is connected to an input channel by means of an input circuit. Each input circuit receives a signal from an input channel. Each input circuit comprises input cells. The input circuits direct the signals to the appropriate input cell dependent upon the destination of the signal. Preferably, the subcircuitry of each input cell comprises a buffer to store the message data package received and a controller to provide any time delay needed for the message data package and to adjust output light intensity as desired for the message data package. Each input cell transmits its signal to a light source and from the light source through a modulating means such as holographic or conventional optics means wherein said modulating means is specific for the destination of the transmission from said input cell. In addition to a buffer and a controller, an input cell may comprise a light source or a modulating means. The signal is then transmitted to a photodetectordetector specific for the source of the signal and from each detector to an output cell. The photodetectors are arranged in a two dimensional matrix wherein each column of the matrix is connected to an output channel by means of an output circuit. Each photodetector transmits its signal to an output cell. Each output circuit transmits a signal, if any, from each of its cells to an output channel. Each output circuit comprises the output cells associated with the photodetectors in one of the columns of the photodetector matrix. Preferably, the subcircuitry of each output cell comprises a buffer to store the message data package received and a controller to provide any time delay needed for the message data package and to adjust output light intensity as desired for the message data package. In addition to a buffer and a controller, an output cell may comprise a detector. The point-to-point interconnection pattern shown in FIG. 8 not only provides contention free switching but also permits connection by means of conventional imaging optics, fibers and waveguide as well as by means of holographic means. Furthermore, it is most preferrable that not only the light sources and their coressponding photodetectors be ideally alligned but that the input cells and their coressponding output cells be ideally alligned. The ideal allignment of the input cells and the output cells greatly simplifies both wired and optic circuitry.

Figure 9:
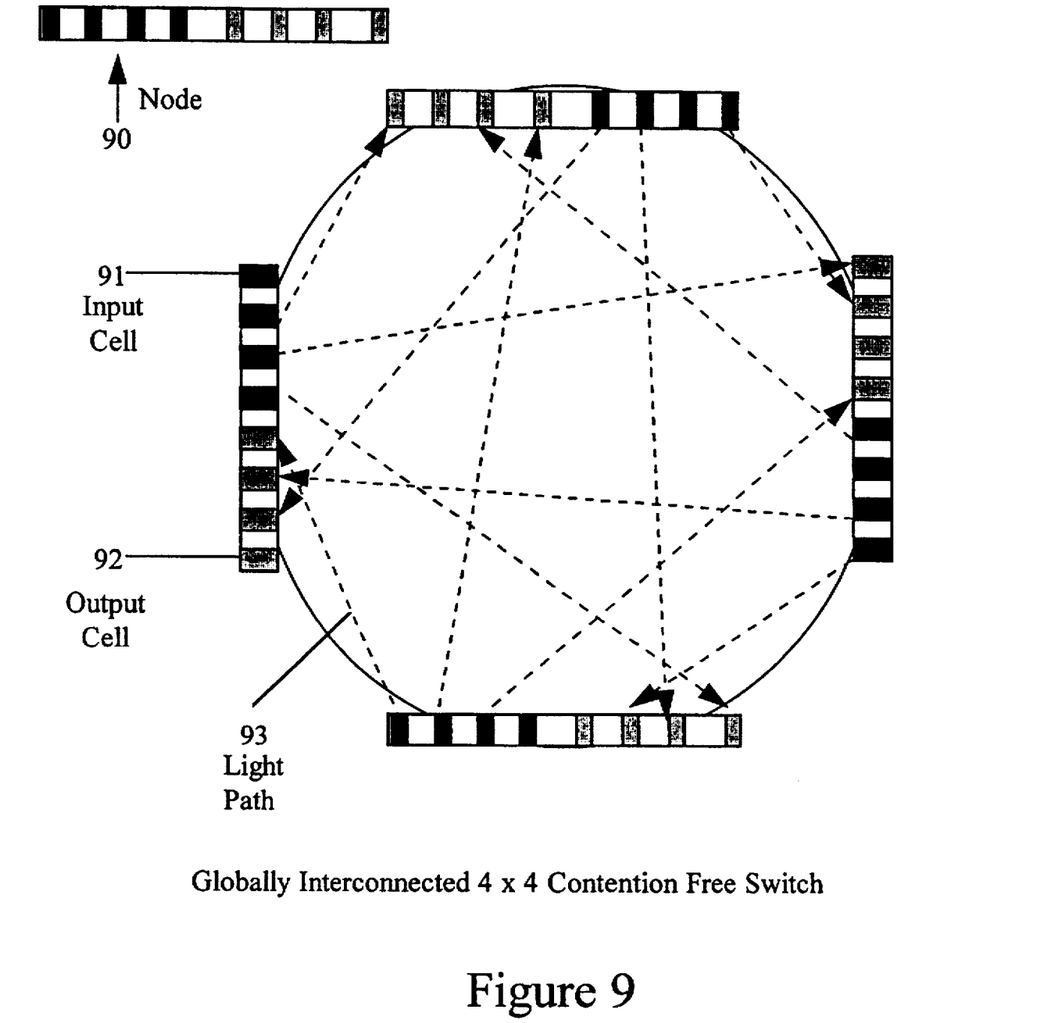
FIG. 9 is a diagram illustrating an interconnection pattern for a fully connected switching system with 4 nodes.
Figure 10:
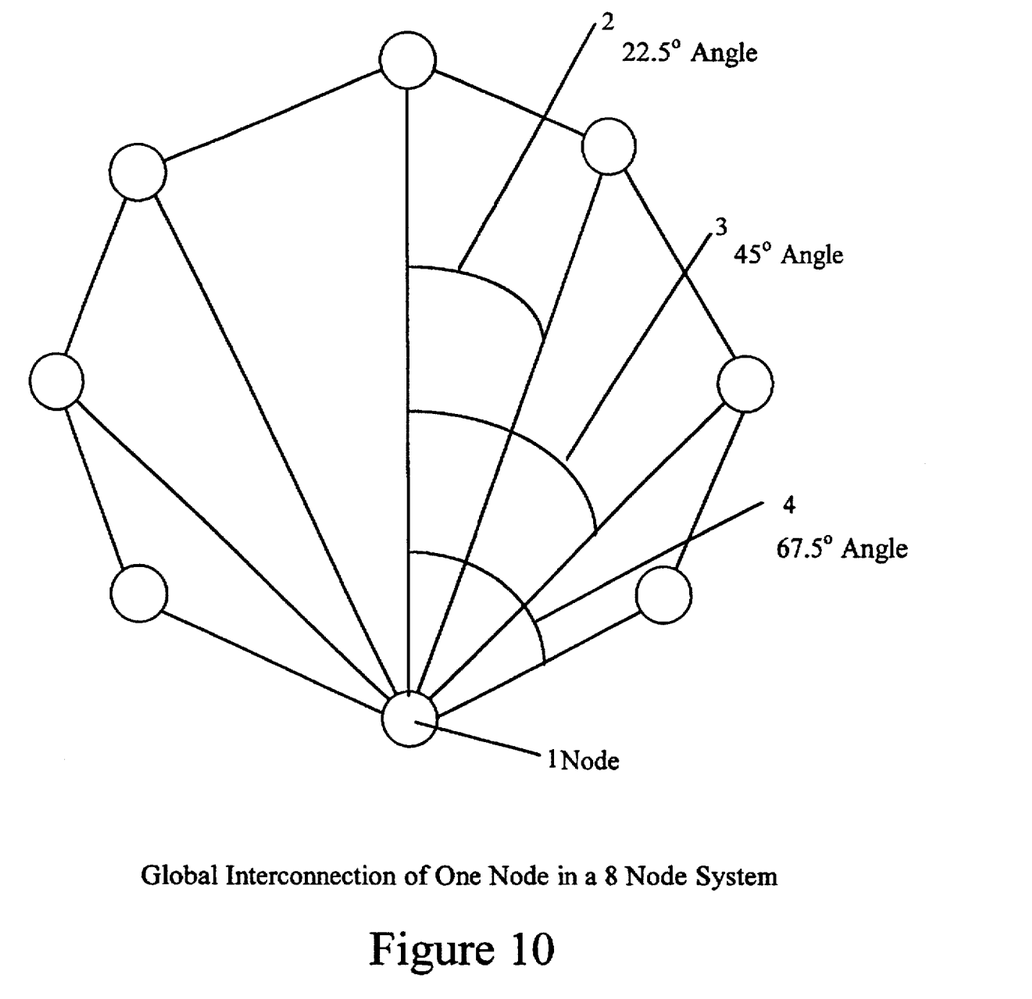
FIG. 10 is a diagram illustrating an interconnection pattern for one node in a completely interconnected system with 8 nodes.

FIG. 9 illustrates a system of globally interconnected nodes. The principles of transmission are otherwise as previously described for crossbar switches but the effect is the creation of a completely interconnected system wherein each node is connected to each node, including itself, of the system. FIG. 9 illustrates the global interconnection of 4 nodes. FIG. 10 illustrates the interconnection pattern for one node (1) in an 8 node system. The angles (2), (3), and (4) are respectively 22.5 degrees, 45 degrees and 67.5 degrees. As illustrated in FIG. 10, there are spatial constraints which must be overcome to make this system practical. These constraints are overcome by using modulating means comprising deflection and refractive optical elements such as dispersing prisms, reflecting prisms and segmented mirrors. Other modulating means such as holograms, holographic or conventional optic waveguides, and gratings may also be used.

Referring to FIG. 9, a node (90) comprises at least one input cell (91) (black squares) and at least one output cell (92) (gray squares). Data is transmitted from an input cell to a light source, such as a VCSEL, and from said light source, along a light path (93), through a modulating means to a photodetector and from a photodetector to an output cell. Preferably, the modulating means are selected from the group consisting of holograms, waveguides, gratings, prisms and mirrors. The modulating means directs or redirects a light path from a light source to a photodetector. Notably, a modulating means may reflect a light path back to the same node from whence it came. Note that although FIG. 9 illustrates that one node is connected to each other node, it is also clear that any one of those connections can be reflected back by a modulating means to connect the node to itself if so desired. It is also noted that more than one type of modulating means can be utilized in a system to effect the routing of a message to its desired location. Thus, the interposition of the appropriate modulating means enables contention free crossbar switch systems, such as those illustrated in FIGS. 4 and 5, to be transposed into fully connected systems.

In the alignment of FIG. 9, a 4×4 contention free crossbar switch comprises 4 nodes, wherein each node comprises an input circuit and an output circuit. Each input circuit is connected to an input channel. Each input circuit receives a signal from said input channel. Each input circuit comprises input cells, depicted in black in FIG. 9. The input circuits direct the signals to the appropriate input cell dependent upon the destination of the signal. Preferably, the subcircuitry of each input cell comprises a buffer to store the message data package received and a controller to provide any time delay needed for the message data package and to adjust output light intensity as desired for the message data package. Each input cell transmits its signal to a light source and from the light source through a modulating means such as holographic or conventional optics means wherein said modulating means is specific for the destination of the transmission from said input cell. In addition to a buffer and a controller, an input cell may comprise a light source or a modulating means. It is preferred that said modulating means comprise a lens to focus and collimate an output beam received from the light source and an array of refractive optical elements such as a dispersing or reflecting micro-prism array or an array of segmented mirrors to redirect the optical beams. The signal is then transmitted to a detector specific for the source of the signal and from each detector to an output cell. The output cells are connected to an output channel by means of an output circuit. Each output circuit transmits a signal, if any, from each of its cells to an output channel. Each output circuit comprises the output cells. Preferably, the subcircuitry of each output cell comprises a buffer to store the message data package received and a controller to provide any time delay needed for the message data package and to adjust output light intensity as desired for the message data package. In addition to a buffer and a controller, an output cell may comprise a detector. To overcome the spatial constraints of large angles of deflection between nodes, it is preferable that the modulating means comprise deflection and refractive optical elements such as dispersing prisms, reflecting prisms and segmented mirrors.

The geometric configurations used in this application are provided for simplicity of illustration and are not intended to limit the scope of the principles herein described.

For example, the principles described for the nodes positioned on the circle of FIG. 9 are also valid for nodes positioned on a square, an octagon or any regular or irregular polygon.

Although the figures illustrate switches in two dimensions, it is noted that the principles related herein also apply to three dimensions. For example, although the switch depicted in FIG. 9 illustrates nodes positioned about a circle, the same principles apply for nodes positioned on the surface of a sphere or other suitable three dimensional surface.

The principles depicted in the figures for 2×2 and 4×4 switches can be extended to an N×M crossbar switch. The principles illustrated in the various figures may be combined in a single switch. Furthermore, any number and variety of the switches herein disclosed can be interconnected to provide a contention free network.

The foregoing description and accompanying drawings are provided for illustration and example. It is understood that various changes, adaptations and modifications may be made without departing from the spirit of the invention which is limited only by the scope of the claims which follow.

What is claimed is:

1. A contention free switch comprising

N input sources of signals and M output destinations for said signals, where N is a positive integer and M is a positive integer an input circuit for each input source, said input circuit comprising an input cell for each output destination, wherein said input circuit directs each signal received from said input source to the input cell specific for the destination of said signal and wherein each input cell transmits said signal to a light source, a light source for each input cell, wherein said light source receives said signal from said input cell and transmits said signal to a photodetector, a photodetector for each light source, wherein said photodetector receives said signal transmitted from said light source and transmits said signal to an output cell, an output cell for each photodetector, wherein said output cell receives said signal from said photodetector and transmits said signal to an output circuit, an output circuit for each output destination, said output circuit comprising an output cell for each input source, said output circuit receiving a signal from each said output cell and transmitting each said signal to said output destination.

2. The switch of claim 1 further comprising modulating means for at least one light source, wherein said modulating means directs said signal transmitted from said at least one light source to a photodetector.

3. The switch of claim 1 wherein said switch comprises at least one buffer.

4. The switch of claim 1 wherein said switch comprises at least one controller.

5. The switch of claim 1 wherein said input cell comprises a buffer.

6. The switch of claim 1 wherein said input cell comprises a controller.

7. The switch of claim 1 wherein at least one light source and its corresponding photodetector are ideally aligned.

8. The switch of claim 1 wherein each light source and its corresponding photodetector are ideally aligned.

9. The switch of claim 1 wherein at least one input circuit is coupled with one output circuit.

10. The switch of claim 1 wherein N equals M.

11. The switch of claim 10 wherein each input circuit is coupled with one output circuit.

12. An interconnection network comprising at least one switch as described in claim 1.

13. A Multistage Interconnection Network comprising at least one switch as described in claim 1.

14. A contention free global interconnection network comprising at least one switch as described in claim 1.

15. A contention free crossbar network comprising at least one switch as described in claim 1.

16. A contention free global interconnection network comprising at least one switch as described in claim 11.

17. The switch of claim 1 wherein said light source is a location on a light source array.

18. The switch of claim 17 wherein said array is a verticalcavity surface-emitting laser array.

19. The switch of claim 2 wherein said modulating means comprises holographic means.

20. The switch of claim 19 wherein said holographic means comprises a holographic waveguide.

21. The switch of claim 2 wherein said modulating means comprises conventional optics means.

22. The switch of claim 21 wherein said conventional optics means comprises one or more lenses.

23. The switch of claim 2 wherein said modulating means comprises fiberoptics.

24. The switch of claim 1 wherein the intensity of said light source is time modulated to transmit data.

25. The switch of claim 1 wherein the intensity of light transmitted from said light source is time modulated by a spatial light modulator.

26. The switch of claim 2 wherein said modulating means comprises a waveguide.

* * * * *